United States Patent
Hubbard

(10) Patent No.: US 11,481,713 B2
(45) Date of Patent: Oct. 25, 2022

(54) DRIVER HISTORY VIA VEHICLE DATA ACQUISITION AND ANALYSIS

(71) Applicant: SPEEDGAUGE, INC., San Francisco, CA (US)

(72) Inventor: Jonathan Hubbard, San Francisco, CA (US)

(73) Assignee: SPEEDGAUGE, INC., San Francisco, CA (US)

( * ) Notice: Subject to any disclaimer, the term of this patent is extended or adjusted under 35 U.S.C. 154(b) by 147 days.

(21) Appl. No.: 16/196,514

(22) Filed: Nov. 20, 2018

(65) Prior Publication Data

US 2019/0156266 A1    May 23, 2019

Related U.S. Application Data

(60) Provisional application No. 62/588,882, filed on Nov. 20, 2017.

(51) Int. Cl.

| | |
|---|---|
| G06Q 10/06 | (2012.01) |
| G01P 11/00 | (2006.01) |
| G01P 7/00 | (2006.01) |
| G01P 15/18 | (2013.01) |
| G01P 1/12 | (2006.01) |
| G08G 1/096 | (2006.01) |
| G08G 1/01 | (2006.01) |

(52) U.S. Cl.
CPC ........ *G06Q 10/06398* (2013.01); *G01P 1/122* (2013.01); *G01P 7/00* (2013.01); *G01P 11/00* (2013.01); *G01P 15/18* (2013.01); *G08G 1/0104* (2013.01); *G08G 1/096* (2013.01)

(58) Field of Classification Search
CPC ................................................ G06Q 10/06398
See application file for complete search history.

(56) References Cited

U.S. PATENT DOCUMENTS 9,847,021 B2 * 12/2017 McClellan ......... G08G 1/09675
9,881,272 B2 *  1/2018 Mitchell ............. G08G 1/0129
(Continued)

FOREIGN PATENT DOCUMENTS

WO    WO-2016122881 A1 *  8/2016  ........... G08G 1/0129

OTHER PUBLICATIONS

Derek Caveny, Collision Avoidance Enabled Through Geospatial Positioning and Intervehicular, Aug. 2010, Minnesota Department of Transportation, IEEE Control Systems Magazine (Year: 2010).*

*Primary Examiner* — Jerry O'Connor
*Assistant Examiner* — Matthew H Divelbiss
(74) *Attorney, Agent, or Firm* — Polsinelli LLP

(57) ABSTRACT

Driving behavior for a particular driver may be gathered and analyzed over a time period, such as a year or a duration of the driver's employment at a particular employer. The driving behavior is received by a server from a positioning device as multiple streams of position data at different time stretches throughout the time period, each stream of position data associated with a route of a plurality of routes driven by at least one vehicle. The server generates speed data from the streams of position data and compares the speed data to retrieved speed limit data for those routes. The server generates a report with at least a speeding percentage value corresponding to how often the driver was speeding while driving during the time period. The report is then sent to the driver's computing device.

22 Claims, 7 Drawing Sheets

(56) References Cited

U.S. PATENT DOCUMENTS

| | | | |
|---|---|---|---|
| 10,445,758 B1* | 10/2019 | Bryer | G06Q 30/0207 |
| 2011/0224898 A1* | 9/2011 | Scofield | G08G 1/0104 |
| | | | 701/532 |
| 2013/0059607 A1* | 3/2013 | Herz | G08G 1/096 |
| | | | 455/456.3 |
| 2017/0076597 A1* | 3/2017 | Beattie, Jr | G08G 1/0962 |

* cited by examiner

FIG. 3A

DRIVER RÉSUMÉ 300
DRIVER NAME 305

OVERALL DRIVER STATISTICS 310

Total time spent driving in 2017:  1305.0 hours
Total miles driven in 2017:  54288.0 miles
Total number of routes driven in 2017: 292
Mean speed in 2017:  41.6 MPH
Median speed in 2017:  47.8 MPH
Standard deviation of speed in 2017:  12.7 MPH
Percentage of driving time in 2017 spent speeding:  14.3%
Percentage of routes in 2017 during which speeding occurred:  9.4%
Percentage of distance driven in 2017 spent speeding:  12.7%
Major driving accidents in 2017: 0
Minor driving accidents in 2017: 1
Harsh braking incidents in 2017: 7

VEHICLE TYPE A 320 

Time spent driving Vehicle Type A in 2017:  522.0 hours
Miles driven in Vehicle A in 2017: 24742.8 miles
Number of routes driven in Vehicle A in 2017: 88
Mean speed in Vehicle A in 2017:  47.4 MPH
Median speed in Vehicle A in 2017:  51.3 MPH
Standard deviation of speed in Vehicle A in 2017:  12.7 MPH
Percentage of driving time in Vehicle A in 2017 spent speeding:  17.6%
Percentage of routes in Vehicle A in 2017 during which speeding occurred:  10.2%
Percentage of distance driven in Vehicle A in 2017 spent speeding:  16.7%
Major driving accidents in Vehicle A in 2017: 0
Minor driving accidents in Vehicle A in 2017: 1
Harsh braking incidents in Vehicle A in 2017: 5

VEHICLE TYPE B 330 

Time spent driving Vehicle Type B in 2017:  783.0 hours
Miles driven in Vehicle B in 2017: 29545.2 miles
Number of routes driven in Vehicle B in 2017: 155
Mean speed in Vehicle B in 2017:  37.7 MPH
Median speed in Vehicle B in 2017:  41.2 MPH
Standard deviation of speed in Vehicle B in 2017:  9.6 MPH
Percentage of driving time in Vehicle B in 2017 spent speeding:  10.1%
Percentage of routes in Vehicle B in 2017 during which speeding occurred:  8.6%
Percentage of distance driven in Vehicle B in 2017 spent speeding:  9.9%
Major driving accidents in Vehicle B in 2017:  0
Minor driving accidents in Vehicle B in 2017:  0
Harsh braking incidents in Vehicle B in 2017: 2

DRIVER HISTORY VIA VEHICLE DATA ACQUISITION AND ANALYSIS

CROSS REFERENCE TO RELATED APPLICATIONS

The present application claims the priority benefit of U.S. Patent Application Ser. No. 62/588,882, titled "Driver History Via Vehicle Data Acquisition and Analysis," filed Nov. 20, 2017, the disclosure of which is incorporated herein by reference.

BACKGROUND OF THE INVENTION

Field of the Invention

The present invention generally pertains to driver and vehicle history analysis. More specifically, the present invention pertains to tracking of drivers and vehicles, analyzing driver safety and quality based, and generation of reports.

Description of the Related Art

A Global Navigation Satellite System (GNSS) is a satellite-based geo-spatial positioning system in which a GNSS receiver device receives signals broadcast by multiple GNSS satellites orbiting the Earth, and, based on the signals from these satellites, is able to determine its own location. Common GNSS systems include the US-based Global Positioning System (GPS), the Russia-based Global Navigation Satellite System (GLONASS), the China-based BeiDou Navigation Satellite System (BDS), and the Europe-based Galileo GNSS.

Some vehicles include navigation devices with integrated GNSS receivers that may be used together with road maps stored on the navigation device to determine a current location of the vehicle within a city's road infrastructure and to assist the driver in determining how to arrive at a desired destination from their current location via the city's road infrastructure. These navigation devices may be built into the vehicle itself, as in a dashboard computer, or may simply be located within the vehicle, as in a driver's smartphone.

However, traditional navigation and vehicle tracking devices lack functionality that allows for broader or more long-term analysis of driving histories, and lacks the ability to track multiple vehicles. There is a need in the art for improved technical solutions for monitoring, analyzing, and reporting behavior of individual drivers over durations of time.

BRIEF DESCRIPTION OF THE DRAWINGS

FIG. 3A illustrates a driver history summary over the course of a year and based on multiple vehicles.

DETAILED DESCRIPTION

Driving behavior for a particular driver may be gathered and analyzed over a time period such as a year or a duration of the driver's employment at a particular employer. The driving behavior is received by a server from a positioning device as multiple streams of position data at different time stretches throughout the time period, each stream of position data associated with a route of a plurality of routes driven by at least one vehicle. The server generates speed data from the streams of position data and compares the speed data to retrieved speed limit data for those routes. The server generates a report with at least a speeding percentage value corresponding to how often the driver was speeding while driving during the time period. The report is then sent to the driver's computing device.

Figure 1:
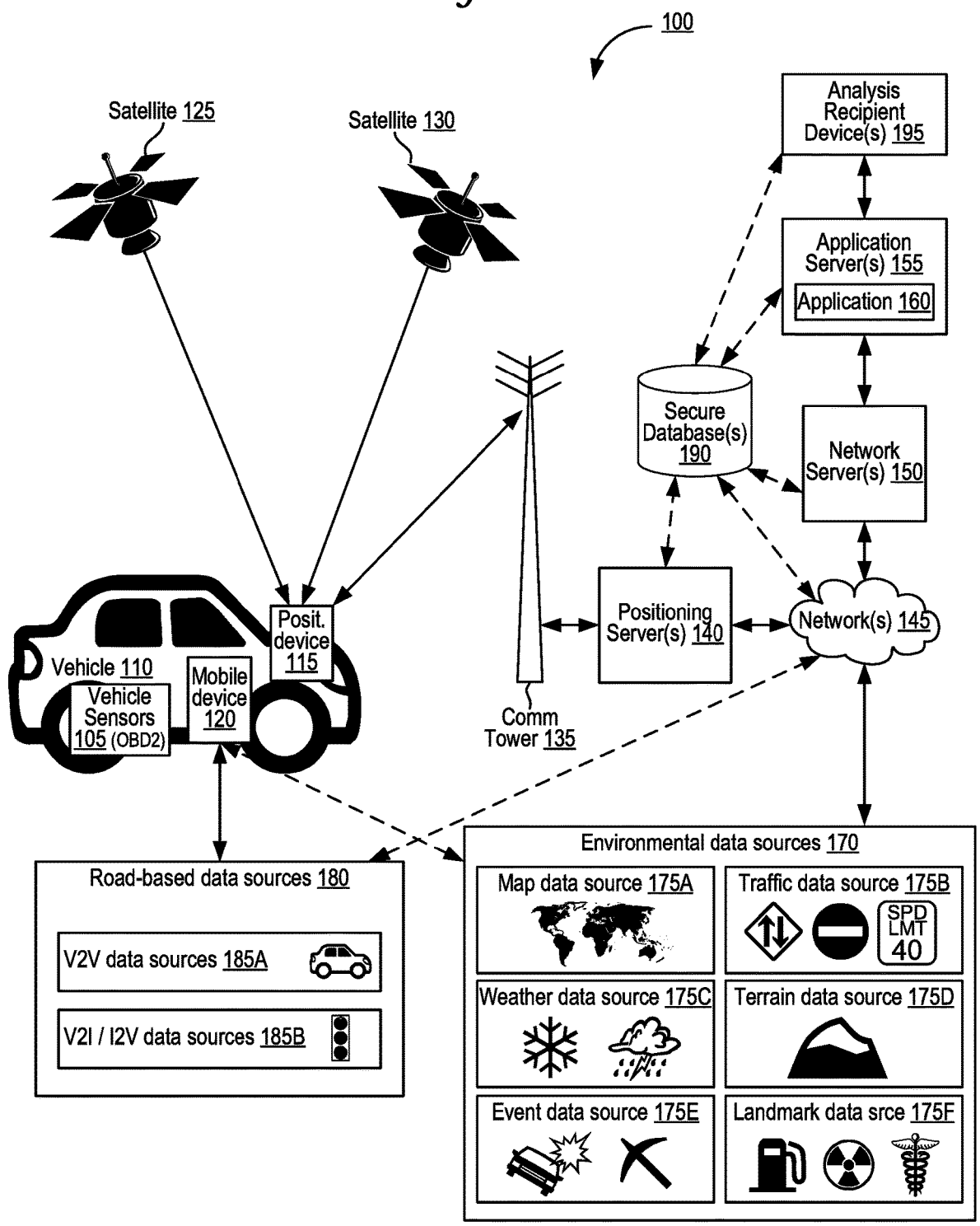
FIG. 1 illustrates a system for tracking a vehicle.

FIG. 1 illustrates a system 100 for tracking a vehicle.

The system 100 of FIG. 1 includes a vehicle 110, a positioning device 115 with a GNSS receiver, a mobile device 120, vehicle sensors 105, GNSS positioning satellites 125 and 130, a communications tower 135, a positioning server 140, a network 145, a network server 150, an application server 155, secure databases 190, recipient devices 195, environment data sources 170, and road-based data sources 180. The application server 155 executes an application 160, which is described in greater detail below.

Though vehicle 110 is illustrated in FIG. 1 as an automobile, it may be any type of vehicle 110 that travels on or through any type of throughway. Vehicle 110 may travel via roads, waterways, airways, or other throughways. The terms "road" or "street" as used herein may include public roads, private roads, toll roads, highways, freeways, residential streets, driveways, bridges, off-road trails, bike lanes, pathways, other thoroughfares allowing for travel via a land-based vehicle, or combinations thereof. A land-based vehicle may be an automobile, a semi-truck, a shipping truck, a motorcycle, a bicycle, a tricycle, a scooter, a sidecar, a pedicab, or combinations thereof.

The vehicle 110 may include a positioning device 115 that may include one or more GNSS receivers that receive from communication satellites 125 and 130 of one or more GNSS types. The positioning device 115 may further communicate with a wireless, data, or cellular communication system by way of the likes of communications tower 135, either via the mobile device 120 or on its own. Positioning device 115 may receive signals from one or more positioning satellites 125 and 130 and determine its geographic location based on the received signals, for example identifying latitude and longitude coordinates, comparing them to map data that is stored at the positioning device 115 and/or received from one or more map servers or positioning servers 140. The positioning device 115 may thereby identify its own position not only using latitude and longitude coordinates, but along particular roads, waterways, airways, or other throughways. The positioning device 115 may be coupled to, secured within, or otherwise disposed within vehicle 110, and may thereby determine the position of the vehicle 110 by determining the position of the positioning device 115. The positioning satellites 125 and 130 may be part of the US-based Global Positioning System (GPS), the Russia-based Global Navigation Satellite System (GLONASS), the China-based BeiDou Navigation Satellite System (BDS), the Europe-based Galileo GNSS, another GNSS system, or combinations thereof. Ideally, at least three satellites would be used to make triangulation possible, though an imprecise location estimate may sometimes be determined from one or two.

While FIG. 1 illustrates GNSS satellites 125 and 130, it should be understood that the positioning device 115 need not include a GNSS receiver, but may instead identify its position based on receipt of one or more signals from land-based signals whose sources have known locations, such as signals from one or more cellular or radio communication towers 135. Ideally, at least three land-based signal sources would be used to make triangulation possible, though a less precise location estimate may be determined from one or two signal sources.

Positioning device 115 may communicate the positioning data either on its own or through mobile device 120 via a cellular communication network by use of communications tower 135, which receives and conveys cellular communications onward throughout a cellular network. The positioning data may be conveyed using a format associated with a particular GNSS, using one or more latitude/longitude coordinates, using one or more street names, using one or more street addresses, or combinations thereof. Positioning device 115 may alternately or additionally communicate the positioning data either on its own or through mobile device 120 via radio frequency signals, wireless local area network (WLAN), 802.11 Wi-Fi, microwave frequency signals, or combinations thereof.

Positioning device 115 may be attached to and/or secured within the vehicle 110, as in a dashboard navigation computer. Positioning device 115 may be included within a mobile device 120 disposed within the vehicle, such as a GNSS receiver and/or positioning chipset within a smartphone or tablet device. The positioning device 115 may be associated with the vehicle 110, an owner of the vehicle, the driver of the vehicle, an employer of the driver of the vehicle, a passenger within the vehicle, an employer of the passenger of the vehicle, or combinations thereof. Likewise, the mobile device 120 may be associated with the vehicle 110, an owner of the vehicle, the driver of the vehicle, an employer of the driver of the vehicle, a passenger within the vehicle, an employer of the passenger of the vehicle, or combinations thereof.

Communications tower 135 may communicate the location information received for vehicle 110 to positioning server 140 and/or network server 150 and/or application server 155. The positioning server 140 of FIG. 1 may be a server associated with a particular GNSS, may be a map/navigation server that provides map data, or a combination thereof. Though cellular networks and communication systems are discussed herein, other communication networks may be used to communicate the GPS and identity data to an application, such as but not limited to satellite communication technology.

Network server 150 may communicate with positioning server 140 or directly with the communication tower 135 through a communication network 145, such as a local area network (LAN) or the Internet. Application server 155 may communicate with network server 150 and/or positioning server 140 and/or the communication tower 135 through a LAN or the Internet. Network server 150 may be implemented as one or more servers implementing a network service. The network server may receive positioning data, perform preliminary processing on the data, and provide the positioning data to application server 155. Positioning server 140, network server 150, and application server 155 may be implemented using one or more computing devices as discussed below with respect to FIG. 5 or FIG. 6.

Network 145 may facilitate communication of data between different servers, devices and machines, such as positioning server 140, network server 150, and application server 155. The network may be implemented, for example, as a private network, public network, intranet, the Internet, a wide area network (WAN), a local area network (LAN), a wireless local area network (WLAN), or combinations thereof.

Application server 155 may be implemented as one or more server computing devices as discussed below with respect to FIG. 5, and includes computer program instructions corresponding to an application 160, which may be executed by one or more processors of the application server 155 to cause the application server 155 to perform application operations associated with the application 160. Application 160 may receive positioning data associated with positioning device 115 and/or mobile device 120. Application 160 may then, through application server 155, process the positioning data along with other geo-data, and identify vehicle and/or driver behavior.

Vehicle and/or driver behavior may be stored in a memory, a hard drive, a flash memory, an optical disk, or another non-transitory computer-readable storage medium by the application server 155 as part of the application operations of the application 160. The application operations may then include various analyses of the stored vehicle and/or driver behavior as discussed further with respect to FIG. 4.

Vehicle and/or driver behavior may be stored in a secure database 190 or other data structure, which may be stored on any kind of memory 520, mass storage 530, or portable storage 540, or another non-transitory computer-readable storage medium by the application server 155 as part of the application operations of the application 160. The application operations may then include various analyses of the vehicle and/or driver behavior/history/analysis/reports as discussed further with respect to FIG. 2, FIG. 3A, FIG. 3B, FIG. 4, and it may then send this analysis to one or more recipient devices 195. The one or more recipient devices 195 may include one or more intermediate recipient devices 195 that then optionally process the received analysis and send data further to other recipient devices 195. In some cases, the recipient devices 195 may include the mobile device 120 associated with the vehicle 110, which may be a mobile device 120 a driver of the vehicle 110. The recipient devices 195 may also include devices associated with a driver's employer or contractee, a driver's auto insurance carrier, a driver's health insurance carrier, and employer or contractee's insurance carrier, a vehicle manufacturer, a vehicle distributor, a vehicle fleet manager or administrator, or combinations thereof.

The vehicle 110 may include, or have coupled thereto, one or more vehicle sensors 105 and/or interfaces, which may include diagnostic sensors and corresponding interfaces such as on-board diagnostics (OBD) implementations. OBD implementations included in or accessible by the vehicle sensors 105 may include, for example, Assembly Line Diagnostic Link (ALDL), OBD-I, OBD-1.5, OBD-II, Multiplex OBD (M-OBD), European OBD (E-OBD), Japan OBD (J-OBD), Australian Design Rule 79/01 (ADR 79/01), ADR 79/02, variants thereof, or combinations thereof.

The one or more vehicle sensors 105 may retrieve data about vehicle maintenance, oil level, headlight functionality status, brake pad functionality status, brake light functionality status, battery level, tire pressure, estimated/actual tire wearing status, time since last tire replacement, time since last oil change, time since last brake pad replacement, time since last tire rotation, odometer mileage, seatbelt functionality status, airbag functionality status, number of major collisions detected by accelerometers, number of minor collisions detected by accelerometers, time since last maintenance, number of major repairs, number of minor repairs, steering column integrity, chassis integrity, vehicle temperature, engine status, vehicle top speed reached, intake air temperature, fan functionality status, air conditioning functionality status, heating functionality status, engine coolant temperature, freeze detection status, overheating detection status, oxygen sensor status, warm-ups since codes cleared, distance travelled since codes cleared, warm-ups overall, distance travelled overall, fuel tank level, absolute barometric pressure, catalyst temperature, ambient air temperature, throttle position, fuel-air ration, time since trouble codes cleared, fuel type, ethanol fuel percentage, vapor pressure, fuel pressure, fuel injection timing, engine fuel rate, driver's demand pressure, engine torque, engine coolant temperature, intake air temperature, fuel pressure, inlet pressure, rotations per minute (RPM) history, wastegate control, filter functionality status, engine runtime history, engine friction, boost pressure, turbocharger pressure, NOx pressure, estimated/actual fuel efficiency, and similar measurements.

The vehicle sensors 105 may include, for example, one or more of any of the following: accelerometers, gyroscopes, gryometers, barometers, magnetometers, compasses, inertial navigation systems (INSs), inertial measurement units (IMUs), inertial reference systems (IRSs), inertial reference units (IRUs), GNSS sensors, brake wear indicators, brake sensors, still image cameras, video cameras, microphones, horn honk usage/pressure sensors, night vision cameras/sensors, rear vision cameras, blind spot detection cameras/sensors, collision sensors, side curtain sensors, steering angle sensors, airbag sensors, wheel speed sensors, cross traffic alert sensors, automatic brake actuator sensors, laser rangefinders, RADAR sensors, LIDAR sensors, active park assist sensors, tire pressure sensors, infrared pedestrian detection/warning sensors, automatic speed control device (ASCD) sensors, lane departure detection sensors, adaptive cruise control sensors, mass air flow (MAF) sensors, engine speed sensors, oxygen sensors, manifold absolute pressure (MAP) sensors, spark knock sensors, fuel temperature sensors, thermometers, thermistors, photoresistors, phototransistors, voltage sensors, voltmeters, ammeters, multimeters, accelerator pedal sensors, brake fluid pressure sensors, barometric pressure sensors, air bag impact sensors, air charge temperature sensors, air cleaner temperature sensors, camshaft position sensors, coolant temperature sensors, crankshaft position sensors, exhaust gas recirculation (EGR) position sensors, EGR valve pressure sensors, engine crankcase pressure sensors, engine rotations per minute (RPM) sensors, engine variable sensors, exhaust temperature sensors, fuel injection pressure sensors, fuel injection timing sensors, heater core temperature sensors, hybrid phase current sensors, ignition misfire sensors, ignition passlock sensors, knock (detonation) sensors, power door resistance sensors, fuel temperature sensors, turbo boost sensors, tail light outage sensors, tachometer sensors, suspension yaw sensors, suspension position sensors, throttle position sensors, top dead center (TDC) sensors, tire pressure monitoring sensors, vacuum sensors, vehicle transmission speed sensors, backup sensors, or combinations thereof. Data from the vehicle sensors 105 may be read by the mobile device 120 and sent through to communication tower 135 and network 145 to application server 155, which may use data from the vehicle sensors 105 as part of its analysis of driver behavior and vehicle status, through which it generates, for example, the driver safety score and driver quality score of interfaces 375 and 385 of FIG. 3B.

The environmental data sources 170 also supply data to the application servers 155 through network 145, and may also optionally provide data to the mobile device 120 and/or recipient device 195. The environmental data sources 170 may include one or more map data sources 175A providing maps of roads and other throughfare, one or more traffic data sources 175B providing data about traffic and speed limits and directional restrictions on roads or throughfares, one or more weather data sources 175C providing data about weather conditions in the sky and on roads, one or more terrain data sources 175D providing data about terrain and elevation and road types (e.g., paved, unpaved, asphalt, cobblestone, dirt, rocky, off-road), one or more event data sources 175E providing data about accidents and construction zones and street festivals and other events that might disrupt or slow driving, one or more landmark data sources 175F providing data about buildings and gas stations and hazardous areas, or combinations thereof. Data from the environmental data sources 170 may be sent through network 145 to application server 155, which may use data from the environmental data sources 170 as part of its analysis of appropriate speeds, for example lowering appropriate speed limits/thresholds/tolerances (as in step 440 of FIG. 4) at night, during rain, during heavy traffic, when roads are icy, or when environmental data sources 170 indicate for one reason or other that it could be more dangerous to drive fast.

The road-based data sources 180 may include vehicle-to-vehicle (V2V) data sources 185A, referring to data received by the vehicle 110 (or by the mobile device 120) from other vehicles (or corresponding mobile devices). The road-based data sources 180 may include infrastructure-to-vehicle (I2V) data sources 185B, referring to data received by the vehicle 110 (or by the mobile device 120) from roadside infrastructure, such as sensors mounted on traffic lights or speed cameras or street signs. The road-based data sources 180 may include infrastructure-to-vehicle (I2V) data sources 185B, referring to data received by infrastructure from the vehicle 110 (or mobile device 120) or from other vehicles (or corresponding mobile devices), which the infrastructure can then communicate to the vehicle 110 (or mobile device 120) through V2I. Examples of V2V data, I2V data, and V2I data may include cameras, positioning devices, proximity sensors, vehicle sensors, environment sensors, and the like. In fact, any of the data types or sensor types discussed with respect to the vehicles sensors 105 and/or environmental data sources 170 may be conveyed by the road-based data sources 180. While the road-based data sources 180 are illustrated communicating to the mobile device 120, it should be understood that they may communicate more directly to the application servers 155 through networks 145.

Figure 5:
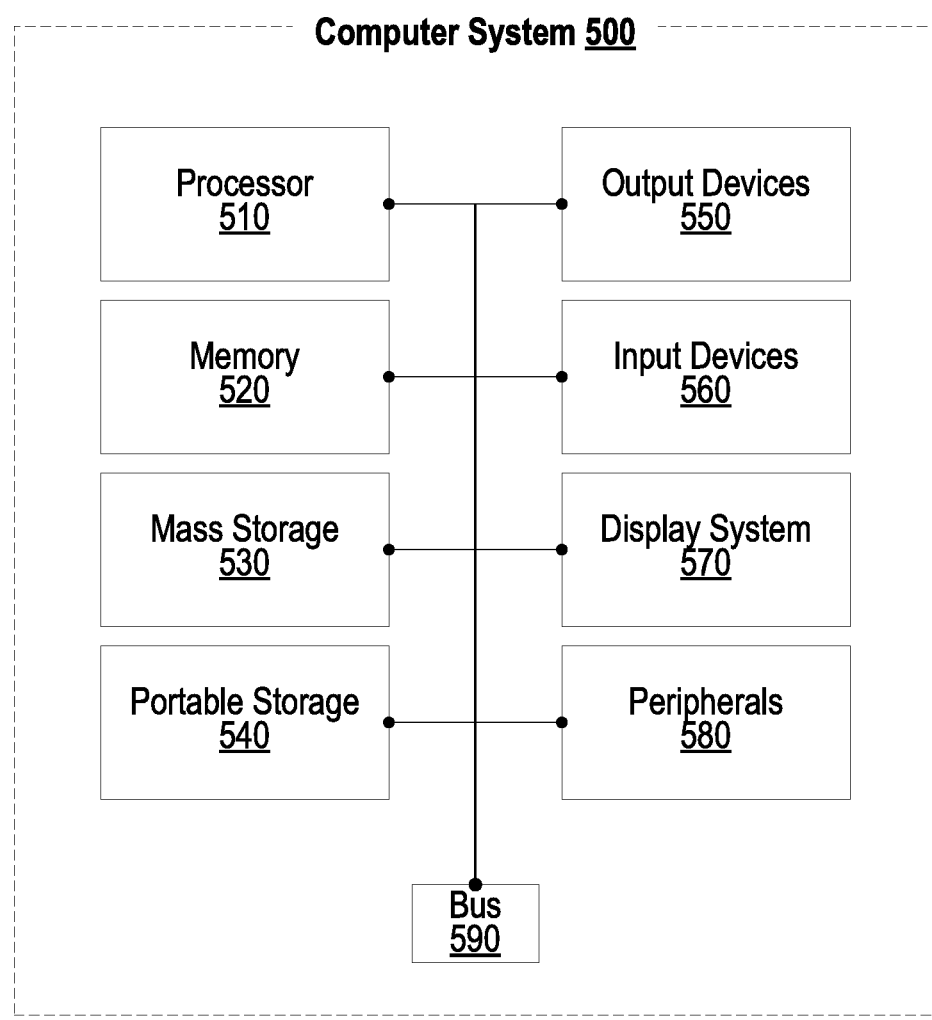
FIG. 5 illustrates an exemplar computing device that may execute one or more embodiments of the invention as disclosed herein.
Figure 6:
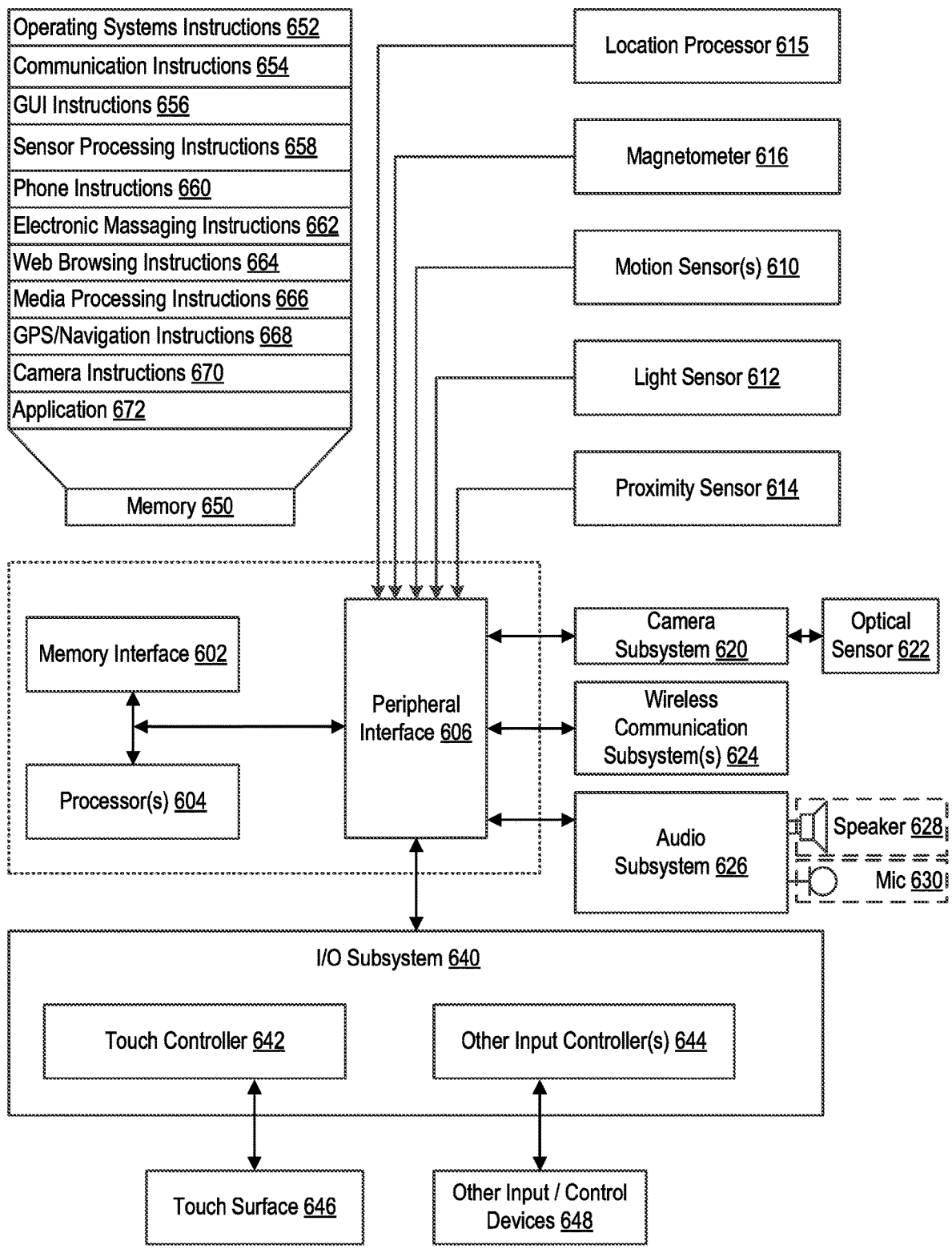
FIG. 6 is a block diagram of an exemplar mobile device that may execute one or more embodiments of the invention as disclosed herein.

All of the devices illustrated in FIG. 1—including the vehicle 110, positioning device 115, mobile device 120, vehicle sensors 105, GNSS positioning satellites 125 and 130, communications towers 135, positioning servers 140, a network 145, network servers 150, application servers 155, secure databases 190, recipient devices 195, environment data sources 170, and road-based data sources 180—may be or may include one or more computing devices 500 or computing devices 600, and/or may include one or more of the components and/or elements illustrated in and/or discussed with respect to FIG. 5 and/or FIG. 6. Furthermore, the one or more secure databases 190 may store data from any combination of these devices: vehicle 110, positioning device 115, mobile device 120, vehicle sensors 105, GNSS positioning satellites 125 and 130, communications towers 135, positioning servers 140, a network 145, network servers 150, application servers 155, secure databases 190, recipient devices 195, environment data sources 170, and road-based data sources 180.

Starting, stopping, pausing, and/or triggering the various data collection processes described in FIG. 1 may be, in some cases, be at least particularly under the control of the driver and/or by an employer so that tracked data corresponds specifically to driving performed by the driver as part of the driver's employment or independent contractor work, and not to personal driving. This may be accomplished by having the driver press a button on the mobile device 120 to start/stop/pause/trigger data collection, for example, or by comparing the routes traveled to routes known to correspond to the driver's employment or independent contractor work. In other cases, the driver may wish to collect data for all driving done, but may want to track driving for work separately from tracking personal driving.

Figure 2:
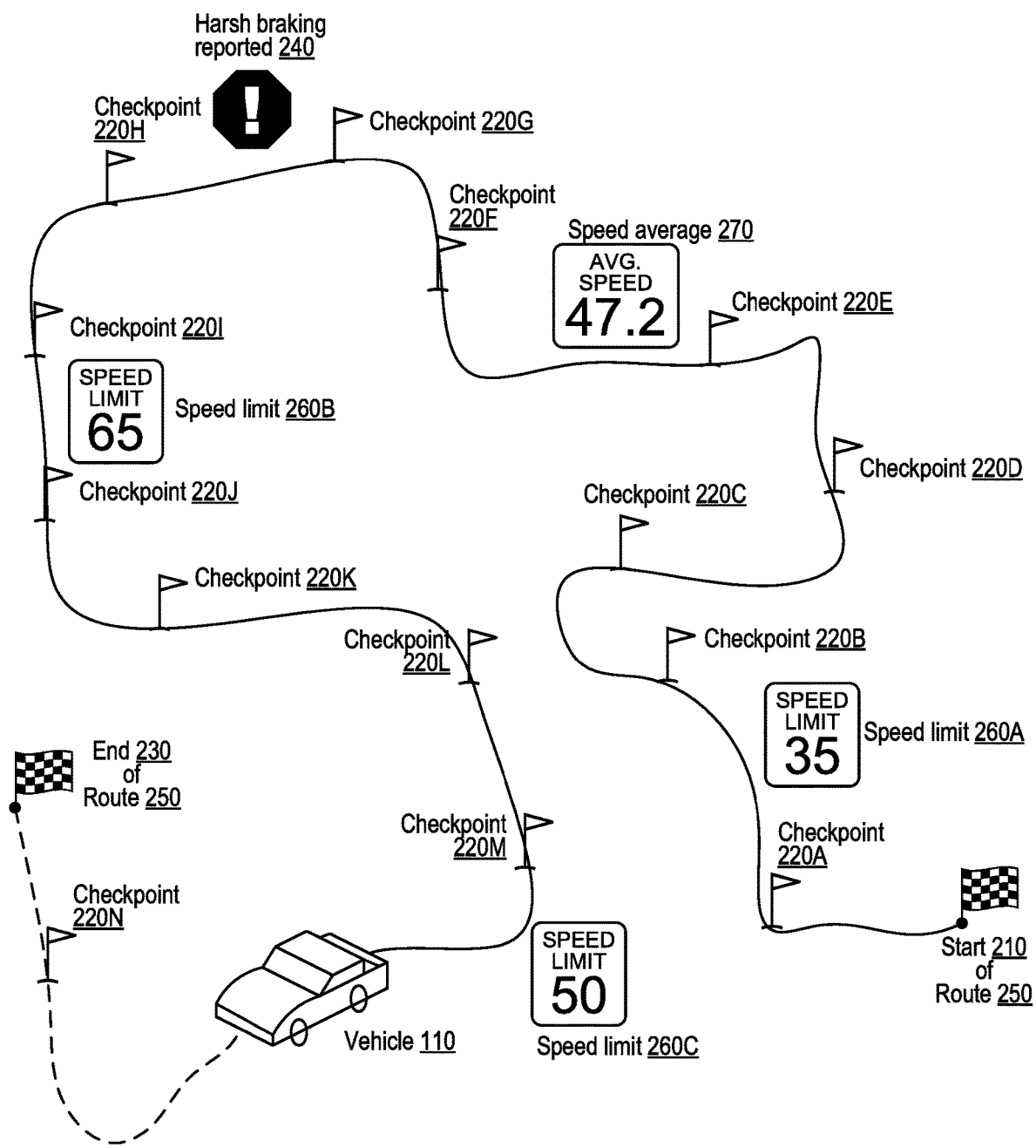
FIG. 2 illustrates a vehicle driving along a route with multiple checkpoints and speed limits.

FIG. 2 illustrates a vehicle driving along a route with multiple checkpoints and speed tolerances.

The term "route" 250 as used herein represents a path traced by a vehicle 110 between (and optionally including) a vehicle 110 starting up at a start point 210, moving some distance, and shutting down, stopping, or pausing at an end point 250. A route 250 can include multiple roads or other throughways, as in navigation through a dense city, or can include merely a portion of a single street or through way, as in navigation along a stretch of a lengthy highway or train track. A vehicle 110 can drive one or more routes 250 per day, or might not drive at all on some days.

Data from the vehicle 110—that is, from the positioning device 115 and/or the mobile device 120—may be collected at one or more checkpoints along each route 250. Multiple checkpoints 220A-220N are illustrated in FIG. 2. The start point 210 and end point 230 may or may not be checkpoints 220. While the checkpoints 220A-220N are spaced fairly far apart in FIG. 2, they may be spaces more closely together in reality, or may alternately be spaced even further apart.

Checkpoints 220 may have different types of triggers, and may be based on information from the positioning device 115, the mobile device 120, other vehicles other than the vehicle 110 but also driving along a same portion of the same route 250 as the vehicle 110, infrastructure along or near the route 250 such as speed meters or weather sensors, various sources of information from the Internet or other networks, or combinations thereof. A checkpoint 220 may occur periodically based on a predetermined time interval—that is, the devices 115/120 may send information once every X minutes, or once every X seconds, or once every X milliseconds, where X is some predetermined number. A checkpoint 220 may occur periodically based on a predetermined distance—that is, the devices 115/120 may send information once every X miles, or once every X feet, or once every X kilometers, or once every X meters, where X is some predetermined number.

A checkpoint 220 may be triggered by behavior of the driver and/or vehicle 110, such as when forward acceleration of the vehicle 110 reaches a predetermined acceleration threshold indicating that the vehicle 110 is speeding up quickly, when sideways acceleration of the vehicle110 reaches a predetermined acceleration threshold indicating that the vehicle 110 is turning and/or changing lanes, when the deceleration of the vehicle 110 reaches a predetermined deceleration threshold indicating that the vehicle 110 is braking quickly, when the vehicle 110 is stopped for a predetermined duration of time, when the vehicle maintains speed within a threshold range for a predetermined duration of time or a predetermined distance, or combinations thereof. Determinations of speed, acceleration, and the like may be determined based on data from the positioning device 115 and/or the mobile device 120, measured via one or more components onboard either or both of those devices, such as one or more GNSS receivers, one or more accelerometers, one or more gyroscopes, one or more cameras, one or more laser rangefinders, one or more radar sensors, one or more sonar sensors, or combinations thereof.

A checkpoint 220 may be triggered by conditions outside of the vehicle, such as an indication that a speed limit along the route 250 has changed, an indication that an average speed of nearby vehicles or other vehicles in the area has changed by at least a threshold amount, a temperature outside the vehicle has changed, a weather condition along the route 250 has changed, traffic information from an outside source of information indicates a traffic jam along the route 250 within a predetermined range of the vehicle 110, traffic information from an outside source of information indicates a vehicular accident along the route 250 within a predetermined range of the vehicle 110, or combinations thereof.

Information along the route 250 indicates information about speed tolerance values. Speed tolerance values may be compares to the vehicle 110's own speed to determine if the vehicle 110 is driving at a safe speed or not. One type of speed tolerance is a speed limit 260, indicated via multiple speed limits 260A-260C along multiple portions of the route 250, which correspond to posted speed limit signs corresponding to those portions of the road(s) along the route 250. Speed limits 260A-260C indicates speed limits of 35 miles per hour (MPH), 65 MPH, and 50 MPH, respectively. Another type of speed tolerance is a speed average 270, indicated along one portion of the route 250 to be 47.2 MPH. Speed average data may be a mean, median, or mode of one or more speeds of other vehicles other than the vehicle 110. These other vehicles may be nearby vehicles, preferably along a same stretch of the same route 250 as the vehicle 110. If the vehicle 110 is driving slower than the speed average 270, it can be inferred that the vehicle is likely driving safely; if the vehicle 110 is driving faster than the speed average 270, it can be inferred that the vehicle is likely driving dangerously. This may be particularly applicable in dangerous weather conditions, such as snow or rain, in which a speed average 270 may be lower than a posted speed limit.

Information along the route 250 may also identify aberrant or dangerous behaviors by vehicle 110 and/or driver of the vehicle 110. For example, the route 250 of FIG. 2 indicates that a harsh baking incident 240 by the vehicle 110 was reported around checkpoints 220G and 220H. This may correspond to the deceleration of the vehicle 110 reaching a predetermined deceleration threshold indicating that the vehicle 110 is braking quickly. Other aberrant or dangerous behaviors, such as vehicle accidents—which may be detected also via an accelerometer and/or gyroscope detecting vibrations/shaking caused by a collision, or capacitive/voltage/inductive sensors detecting crumples or other damage to surface(s) of the vehicle 110—may also be reported.

FIG. 3A illustrates a driver history summary over the course of a year and based on multiple vehicles.

The application server 155 may collect the various types of vehicle information illustrated and discussed with respect to FIG. 2 about one or more vehicles 110 driven by a particular driver over numerous routes 250. The application 160 at the application server 155 may then generate a driver history based on an aggregation and analysis of this information. This driver history may, for example, take the form of a "driver résumé" 300 as illustrated in FIG. 3A. This driver history is one example of an analysis, history, or report output to the recipient device 195 in FIG. 1, or of the report discussed in steps 460 and 470 of FIG. 4.

The driver résumé 300 of FIG. 3A may identify the driver via a name 305 of the driver or some other identifier, such as an employee number, for example if the driver works for an employer that requires the driver to transport objects or individuals.

Such an employer could be, for example, a transportation organization, a supplier organization, a distributor organization, a delivery organization, a mass transit organization, an individual transit organization, or some combination thereof. The vehicles in question may be personal vehicles may be supply vehicles, distribution vehicles, delivery vehicles, mass transit vehicles, taxicabs, ridesharing vehicles, or some combination thereof.

The information in the "driver résumé" 300 summarizes the driver's behavior over a particular time period, in this case the year 2017. An "overall driver statistics" section 310 includes the following statistics:

Total time spent driving in 2017: 1305.0 hours
Total miles driven in 2017: 54288.0 miles
Total number of routes driven in 2017: 292
Mean speed in 2017: 41.6 MPH
Median speed in 2017: 47.8 MPH
Standard deviation of speed in 2017: 12.7 MPH
Percentage of driving time in 2017 spent speeding: 14.3%
Percentage of routes in 2017 during which speeding occurred: 9.4%
Percentage of distance driven in 2017 spent speeding: 12.7%
Major driving accidents in 2017: 0
Minor driving accidents in 2017: 1
Harsh braking incidents in 2017: 7

The information in the "driver résumé" 300 summarizes the driver's behavior over in a first type of vehicle—termed "Vehicle Type A"—over the same particular time period, in this case the year 2017. The corresponding "Vehicle Type A" 320 statistics section 320 includes the following statistics:

Time spent driving Vehicle Type A in 2017: 522.0 hours
Miles driven in Vehicle A in 2017: 24742.8 miles
Number of routes driven in Vehicle A in 2017: 88
Mean speed in Vehicle A in 2017: 47.4 MPH
Median speed in Vehicle A in 2017: 51.3 MPH
Standard deviation of speed in Vehicle A in 2017: 12.7 MPH
Percentage of driving time in Vehicle A in 2017 spent speeding: 17.6%
Percentage of routes in Vehicle A in 2017 during which speeding occurred: 10.2%
Percentage of distance driven in Vehicle A in 2017 spent speeding: 16.7%
Major driving accidents in Vehicle A in 2017: 0
Minor driving accidents in Vehicle A in 2017: 1
Harsh braking incidents in Vehicle A in 2017: 5

The information in the "driver résumé" 300 summarizes the driver's behavior over in a first type of vehicle—termed "Vehicle Type B"—over the same particular time period, in this case the year 2017. The corresponding "Vehicle Type B" 330 statistics section 320 includes the following statistics:

Time spent driving Vehicle Type B in 2017: 783.0 hours
Miles driven in Vehicle B in 2017: 29545.2 miles
Number of routes driven in Vehicle B in 2017: 155
Mean speed in Vehicle B in 2017: 37.7 MPH
Median speed in Vehicle B in 2017: 41.2 MPH
Standard deviation of speed in Vehicle B in 2017: 9.6 MPH
Percentage of driving time in Vehicle B in 2017 spent speeding: 10.1%
Percentage of routes in Vehicle B in 2017 during which speeding occurred: 8.6%
Percentage of distance driven in Vehicle B in 2017 spent speeding: 9.9%
Major driving accidents in Vehicle B in 2017: 0
Minor driving accidents in Vehicle B in 2017: 0
Harsh braking incidents in Vehicle B in 2017: 2

The "speeding" incidents recorded in the "driver résumé" 300 may correspond times or stretches of road when the driver's vehicle 110 exceeded a posted speed limit 260, exceeded a speed average 270, or some combination thereof. Speeding indicates may alternately or additional be defined in a more complex fashion, such as the vehicle 110 exceeding the speed average 270 plus a predefined multiple of a speed standard deviation value corresponding to the speed average 270.

Other types of incidents may be recorded in the "driver résumé" 300, such as a number of detected instances of sudden turns by the driver's vehicle 110, a number of detected instances of sudden lane changes by the driver's vehicle 110, a number of detected instances of hard/harsh braking by the driver's vehicle 110, a number of detected instances of hard/harsh acceleration by the driver's vehicle 110, a number of identified traffic citations for the driver, a number of times that the driver's vehicle 110 was pulled over by authorities such as police (e.g., based on public or private police records or self-reporting), a number of times that the driver honked the horn of the driver's vehicle 110 (e.g., based on a horn use sensor), or a number of times when horn honks of other vehicles were audible and recorded by one or more microphones of mobile device 120/positioning device 115 in the vicinity of the driver's vehicle 110. Incidents may relate to anything that can be recorded by any of the data sources identified in FIG. 1, such as the positioning device 115, the vehicle sensors 105, the mobile device 120, the road-based data sources 180, and/or the environment data sources 170.

While the time period described in the "driver résumé" 300 of FIG. 3A is a particular year—2017—it may be a different kind of time period. For example, the time period may be one or more days, one or more weeks, one or more months, one or more years, or one or more decades. The time period may include at least part of a term of employment or independent contractor work of a driver at a particular employer or principal/contractee.

Figure 3B:
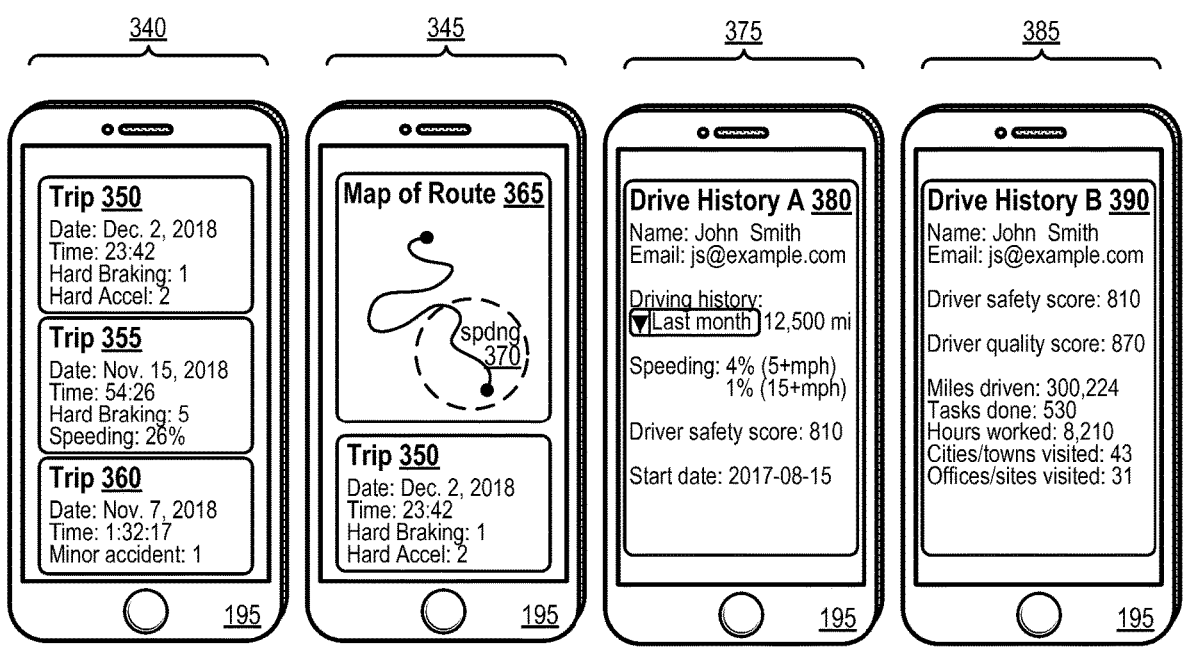
FIG. 3B identifies interfaces through which driver history reports may be viewed.

FIG. 3B identifies interfaces through which driver history reports may be viewed. These interfaces include a first interface 340, a second interface 345, a third interface 375, and a fourth interface 385.

The first interface 340 of FIG. 3B lists three trips: a first trip 350, a second trip 355, and a third trip 360. The first trip 350 was on Dec. 2, 2018, lasted 23 minutes and 42 seconds, and included one instance of hard braking and two instances of hard acceleration. The second trip 355 was on Nov. 15, 2018, lasted 54 minutes and 26 seconds, and included five instances of hard braking, and includes speeding for 26% of the route. The third trip 360 was on Nov. 7, 2018, lasted one hour and 32 minutes and 17 seconds, and one minor accident was detected on this trip. The interface 340 may include any other type of data discussed with respect to FIG. 1, FIG. 2, FIG. 3A, or FIG. 4.

The second interface 345 of FIG. 3B includes the same information about the first trip 350 as in the first interface 340 of FIG. 3B, and also includes a map 365 of the route taken during the first trip 350. This includes a start point and an endpoint, and includes a marked area of the map 370 during which the driver was speeding.

The third interface 375 includes a driver history 380 (part "A") for a driver named "John Smith" whose email address is listed as "js@example.com." A period of time—the "last month" or most recent month—is selected from a dropdown menu of potential time periods. The history 380 indicates that the driver drove 12,500 miles in the last/most recent month. The history 380 indicates percentages of those 12,500 miles during which the driver was speeding, and by how much. Specifically, the driver was speeding 4% of that time by 5 or more miles per hour over a speed limit/threshold/tolerance, and the driver was speeding only 1% of that time by 15 or more miles per hour over a speed limit/threshold/tolerance.

A driver safety score of 810—from a range from 0 (very risky driver) to 1000 (very safe driver)—is identified in the history 380. The driver safety score may be computed based on how well the driver does with respect any of the aspects identified in FIG. 1, FIG. 2, FIG. 3A or FIG. 3B, or FIG. 4 that pertain to safety, such as speeding, hard/harsh braking, hard/harsh acceleration, weaving between lanes, and the like. The driver safety score may be absolute—that is, based on comparisons to independent predetermined thresholds—or may be relative, for example based on averages and standard deviations of other driver behavior. The history 380 also identifies a start date for the driver of Aug. 15, 2017.

The fourth interface 385 includes a driver history 390 (part "B") for the driver named "John Smith" whose email address is "js@example.com." The driver safety score from the history 380 is also identified in the history 390. The history 390 identifies additional work-focused milestones, indicating that the driver has driven a total of 300,225 miles, has accomplished 530 tasks, has worked for a total of 8,210 hours, has visited 43 cities/towns, and has visited 31 offices/worksites. A driver quality score of 870 is also identified in the history 390—from a range from 0 (poor quality driver) to 1000 (excellent quality driver)—is identified in the history 390. The driver quality score may be based more on these work-focused or job-focused attributes, such as hours worked and tasks accomplished and the other metrics in the history 390, than on safety (at least in comparison to the driver safety score of the history 380).

Figure 4:
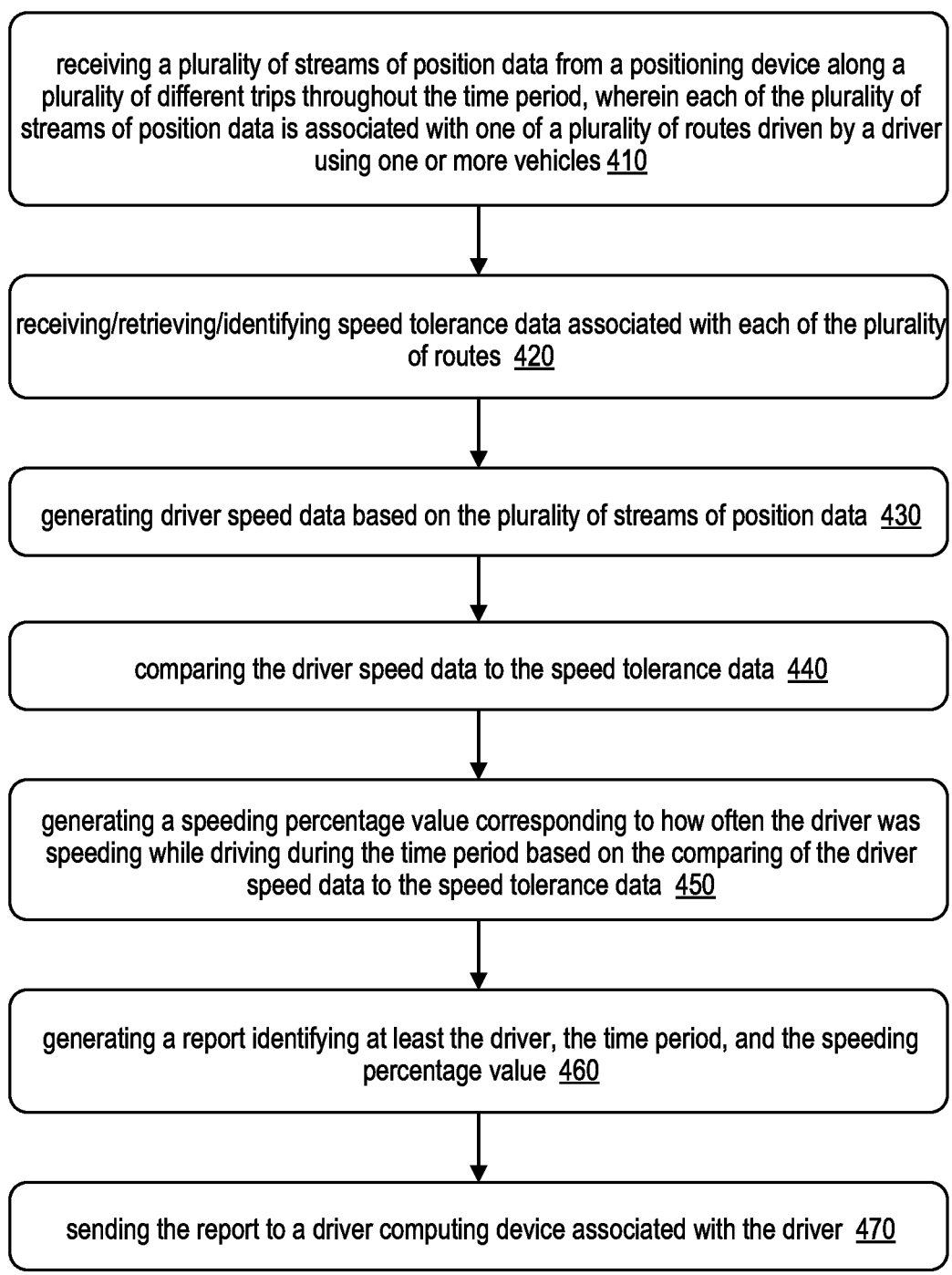
FIG. 4 is a flow diagram illustrating a method for analyzing driver behavior over time.

The interfaces 340, 345, 375, and 385 of FIG. 3B may be displayed upon a recipient device 195, such as the mobile device 120, and are examples of analyses, histories, or reports output to the recipient device 195 in FIG. 1, or of the report discussed in steps 460 and 470 of FIG. 4. While the interfaces 340, 345, 375, and 385 of FIG. 3B focus on individual trips or individual routes, a broader overview of multiple trips over a time period, like the one in FIG. 3A, can be included as well.

Furthermore, a mixture of the broad overview of FIG. 3A with a focus on specific trips as in FIG. 3B can be included—for example, an analysis can be shown in which a broad overview as in FIG. 3A is presented, with particular trips highlighted that represent the best or worst in a particular category, such as trips during which the driver was speeding the most or the least, trips during which the driver was in the largest number of accidents and/or most severe accidents, trips during which the driver used hard/harsh braking most often, trips during which the driver used hard/harsh acceleration most often, trips during which the driver's speed most exceeded average speeds of nearby vehicles, trips during which the driver's speed was inappropriately high given environmental conditions such as rain or ice, and the like.

FIG. 4 is a flow diagram illustrating a method for analyzing driver behavior over time. This method may be performed by the application 160 of the application server 160, sometimes in combination with the positioning server(s) 140, network server(s) 150, secure database(s) 190, and/or one or more mobile device(s) 120. Some aspects of it may alternately or additionally be performed by any single device or combination of devices illustrated in FIG. 1.

A first step 410 of the method includes receiving a plurality of streams of position data from a positioning device along a plurality of different trips throughout the time period, wherein each of the plurality of streams of position data is associated with one of a plurality of routes driven by a driver using one or more vehicles. Alternately or additionally, additional data from the vehicle sensors 105, road-based data sources 180, and/or environmental data sources 170 may also be received.

A next step 420 includes identifying speed tolerance data associated with each of the plurality of routes, after having optionally received it from environmental data sources 170 or retrieved it from memory of the application servers 155, secure databases 190, network servers 150, or positioning servers 140. Identifying speed tolerance data may include calculating speed limits, thresholds, or tolerances based on average speeds in an area or of vehicles in the proximity of the vehicle 110 (and its driver) at a given time. Data from posted speed limits may be used instead or may be combined mathematically, such as via average, with the calculated speed limit based on average nearby vehicle speed. Environmental data from vehicle sensors 105 such as thermometers or environmental data sources 170 may be factored into generating speed limits, thresholds, or tolerances as well, for example reducing speed limits, thresholds, or tolerances during rain, when the sky is dark or cloudy or foggy, or when roads are icy.

A next step 430 includes generating driver speed data based on the plurality of streams of position data. Driver speed data may be generated alternately or additionally based on data from other vehicle sensors 105, road-based data sources 180, and/or environmental data sources 170. For example, V2V or I2V data 185 from a speed camera may be used, accelerometer data from an accelerometer from the vehicle sensors 105 onboard the vehicle 110 may be used, gyroscope data from an accelerometer from the vehicle sensors 105 onboard the vehicle 110 may be used, or some combination thereof.

A next step 440 includes comparing the driver speed data to the speed tolerance data. A next step 450 includes generating a speeding percentage value corresponding to how often the driver was speeding while driving during the time period based on the comparing of the driver speed data to the speed tolerance data. Speeding may be defined here is the driver exceeding the speed limits, thresholds, or tolerances of the speed tolerance data of step 420 by any amount. Speeding may alternately be defined here is the driver exceeding the speed limits, thresholds, or tolerances of the speed tolerance data of step 420 by at least a threshold amount. For example, a 5 mile per hour (mph) or 10 mph "leeway" over a posted or generated speed limit, threshold, or tolerance can be granted to the driver and vehicle to allow drivers freedom to overtake/pass slow vehicles. This speed "leeway" may be accompanied by a time limit—for instance, a driver/vehicle driving 10 mph over a posted or generated speed limit, threshold, or tolerance might not be considered speeding, but only up to a threshold time, such as 30 seconds at a time or less.

A next step 460 includes generating a report identifying at least the driver, the time period, and the speeding percentage value. Examples of such as information that might be found in such a report are listed at least at FIG. 3A and FIG. 3B, and are discussed with respect to FIG. 1 and FIG. 2 as well. A next step 470 includes sending the report to a driver computing device associated with the driver.

The speed tolerance data associated with each of the plurality of routes may include a speed limit associated with at least a portion of at least one route, wherein the driver speeding corresponds to the driver moving faster than the at least one speed limit. The speed tolerance data associated with each of the plurality of routes may include one or more other vehicle speeds associated with one or more other vehicles other than the one or more driver vehicles, wherein the driver speeding corresponds to the driver moving faster than the one or more other vehicles.

The time period may be at least one year, at least one month, at least one week, at least one day, or combinations thereof. The time period may correspond to at least a portion of a driving career of the driver during which the driver worked for a particular employer.

One additional step not illustrated in FIG. 4 may include generating a plurality of vehicle-specific speeding percentage values when the report tracks a driver who drove more than one tracked vehicle during the time period, wherein each vehicle-specific speeding percentage value corresponds to how often the driver was speeding while driving each one of the one or more tracked vehicles during the time period.

The term "driver" is used herein can be replaced with "operator" or "supervisor" as appropriate, such as for vehicles that are autonomous or semi-autonomous and require more minimal operation or supervision than traditional vehicles. Such terms may also apply to vehicles that require additional operation than traditional transportation vehicles to control functionalities that are not present in traditional transportation vehicles, such as for forklifts, tractors, bulldozers, construction vehicles, fire trucks, waste management vehicles, cement mixing vehicles, fuel transport vehicles, and the like.

FIG. 5 illustrates an exemplary computing system 500 that may be used to implement an embodiment of the present invention. For example, any of the computer systems or computerized devices described herein may, in at least some cases, be a computing system 500. The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 500 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 500 may be part of a multi-computer system that uses multiple computer systems 500 (e.g., for one or more specific tasks or purposes). For example, the multi-computer system may include multiple computer systems 400 communicatively coupled together via one or more private networks (e.g., at least one LAN, WLAN, MAN, or WAN), or may include multiple computer systems 500 communicatively coupled together via the internet (e.g., a "distributed" system), or some combination thereof.

FIG. 6 is a block diagram of an exemplar mobile device 600 that may execute one or more embodiments of the invention as disclosed herein. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device can be conFIG.d as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be conFIG.d to facilitate processing voice commands, voice printing and voice authentication.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™. The computing device 600 can, therefore, include a 36-pin connector that is compatible with other devices like an iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement one or more of the features described above.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store other software instructions 672 to facilitate other processes and functions as described above.

The memory 650 can also store other software instructions (not shown. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) 674 or similar hardware identifier can also be stored in memory 650.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

Embodiments of the invention may be implemented on any computing device, including mobile devices such as Apple iPhones, Android phones, or any mobile electronic device with a touch screen. In the preferred embodiment of the invention, the selection boxes depicted in the figures are displayed on a touch screen. In certain instances one or more of the selection boxes may be a physical button on the client device.

The foregoing detailed description has been presented for purposes of illustration and description. It is not intended to be exhaustive or limiting unless expressly stated to the contrary. Modifications and variations are possible in light of the above teachings that otherwise best explain the principles of the present invention and its practical application. The scope of the present invention is otherwise intended to be limited only by the claims appended hereto.

What is claimed is:

1. A method of tracking driver analytics over a time period, the method comprising:
    receiving a plurality of streams of position data from a positioning device along a plurality of different trips throughout the time period, wherein each of the plurality of streams of position data is associated with one of a plurality of routes driven by a driver using one or more vehicles, wherein the plurality of routes includes at least one checkpoint associated with a change from a first environmental condition to a second environmental condition;
    identifying speed tolerance data associated with each of the plurality of routes, wherein the speed tolerance data identifies at least a first speed threshold associated with the first environmental condition and a second speed threshold associated with the second environmental condition;
    generating driver speed data based on the plurality of streams of position data;
    comparing the driver speed data to the speed tolerance data;
    generating, based on the comparing of the driver speed data to the speed tolerance data, a first speeding percentage value and a second speeding percentage value, the first speeding percentage value corresponding to a first percentage of at least a subset the plurality of routes along which the one or more vehicles were speeding by at least the first speed threshold while driven by the driver during the time period and before the at least one checkpoint, the second speeding percentage value corresponding to a second percentage of at least the subset of the plurality of routes along which the one or more vehicles were speeding by at least the second speed threshold while driven by the driver during the time period and after the at least one checkpoint;
    generating a report identifying at least the driver, the time period, and the first speeding percentage value and the second speeding percentage value; and
    sending the report to a recipient device.

2. The method of claim 1, wherein the speed tolerance data associated with each of the plurality of routes includes one or more posted speed limits applicable to one or more portions of the plurality of routes driven by the driver using the one or more vehicles.

3. The method of claim 1, wherein the speed tolerance data associated with each of the plurality of routes includes one or more speed limits that are based on one or more other vehicle speeds associated with one or more other vehicles traveling along at least one of the plurality of routes other than the one or more vehicles driven by the driver.

4. The method of claim 3, further comprising calculating an average speed of at least two of the one or more other vehicle speeds associated with at least one of the one or more other vehicles, wherein the one or more speed limits are based on the average speed.

5. The method of claim 1, wherein the time period corresponds to at least a portion of an employment period of the driver with a particular employer.

6. The method of claim 1, further comprising generating a vehicle-specific speeding percentage value for each of the one or more vehicles, each vehicle-specific speeding percentage value identifying how often the driver was speeding while driving a corresponding vehicle of the one or more vehicles during the time period.

7. The method of claim 1, further comprising generating hard braking data based on the plurality of streams of position data, the hard braking data identifying one or more instances of hard braking by the driver driving one of the one or more vehicles during the time period.

8. The method of claim 1, further comprising generating hard acceleration data based on the plurality of streams of position data, the hard acceleration data identifying one or more instances of hard acceleration by the driver driving one of the one or more vehicles during the time period.

9. The method of claim 1, further comprising receiving a one or more streams of accelerometer data from a device electrically coupled to at least one accelerometer along the plurality of different trips throughout the time period, wherein generating the driver speed data is also based on the one or more streams of accelerometer data.

10. The method of claim 1, further comprising receiving a one or more streams of gyroscope data from a device electrically coupled to at least one gyroscope along the plurality of different trips throughout the time period, wherein generating the driver speed data is also based on the one or more streams of gyroscope data.

11. The method of claim 1, further comprising:
    identifying a first time at which a first speed of the driver speed data exceeds a posted speed limit by at least a speed leeway;
    identifying a second time at which a second speed of the driver speed data stops exceeding the posted speed limit by at least the speed leeway;
    identifying an amount of time to associated with an event based on a comparison of the first time and the second time;
    comparing the amount of time with a time limit; and
    classifying the event based on the comparison of the amount of time with the time limit.

12. The method of claim 1, further comprising generating a driver safety score based on at least one of the first speeding percentage value and the first speeding percentage value, wherein the report includes the driver safety score.

13. The method of claim 1, wherein the first speeding percentage value is associated with a percentage of driving time speeding and the second speeding percentage value is associated with a percentage of driving distance spent speeding.

14. A system for tracking driver analytics over a time period, the system comprising:
a communication transceiver that receives a plurality of streams of position data from a positioning device and that sends a report to a recipient device, the plurality of streams of position data corresponding to different trips throughout the time period, wherein each of the plurality of streams of position data is associated with one of a plurality of routes driven by a driver using one or more vehicles, wherein the plurality of routes includes at least one checkpoint associated with a change from a first environmental condition to a second environmental condition;
a memory that stores instructions; and
a processor, wherein execution of the instructions by the processor causes the processor to:
identify speed tolerance data associated with each of the plurality of routes, wherein the speed tolerance data identifies a first speed threshold associated with the first environmental condition and a second speed threshold associated with the second environmental condition,
generate driver speed data based on the plurality of streams of position data,
compare the driver speed data to the speed tolerance data,
generate, based on the comparing of the driver speed data to the speed tolerance data, a first speeding percentage value and a second speeding percentage value, the first speeding percentage value corresponding to a first percentage of at least a subset the plurality of routes along which the one or more vehicles were speeding by at least the first speed threshold while driven by the driver during the time period and before the at least one checkpoint, the second speeding percentage value corresponding to a second percentage of at least the subset of the plurality of routes along which the one or more vehicles were speeding by at least the second speed threshold speeding while driven by the driver during the time period and after the at least one checkpoint, and
generate the report, the report identifying at least the driver, the time period, and the first speeding percentage value and the second speeding percentage value.

15. The system of claim 14, wherein the speed tolerance data associated with each of the plurality of routes includes one or more posted speed limits applicable to portions of the plurality of routes driven by the driver using the one or more vehicles.

16. The system of claim 14, wherein the speed tolerance data associated with each of the plurality of routes includes one or more speed limits that are based on one or more other vehicle speeds associated with one or more other vehicles traveling along at least one of the plurality of routes other than the one or more vehicles driven by the driver.

17. The system of claim 16, wherein execution of the instructions by the processor causes the processor to also calculate an average speed of at least two of the one or more other vehicle speeds associated with at least one of the one or more other vehicles, wherein the one or more speed limits are based on the average speed.

18. The system of claim 14, wherein execution of the instructions by the processor causes the processor to also generate hard braking data based on the plurality of streams of position data, the hard braking data identifying one or more instances of hard braking by the driver driving one of the one or more vehicles during the time period.

19. The system of claim 14, wherein execution of the instructions by the processor causes the processor to also generate hard acceleration data based on the plurality of streams of position data, the hard acceleration data identifying one or more instances of hard acceleration by the driver driving one of the one or more vehicles during the time period.

20. The system of claim 14, wherein the communication transceiver also receives one or more streams of accelerometer data from a device electrically coupled to at least one accelerometer along the different trips throughout the time period, wherein generating the driver speed data is also based on the one or more streams of accelerometer data.

21. The system of claim 14, wherein the communication transceiver also receives one or more streams of gyroscope data from a device electrically coupled to at least one gyroscope along the different trips throughout the time period, wherein generating the driver speed data is also based on the one or more streams of gyroscope data.

22. A non-transitory computer readable storage medium having embodied thereon a program, wherein the program is executable by a processor to perform a method of tracking driver analytics over a time period, the method comprising:
receiving a plurality of streams of position data from a positioning device along a plurality of different trips throughout the time period, wherein each of the plurality of streams of position data is associated with one of a plurality of routes driven by a driver using one or more vehicles, wherein the plurality of routes includes at least one checkpoint associated with a change from a first environmental condition to a second environmental condition;
identifying speed tolerance data associated with each of the plurality of routes, wherein the speed tolerance data identifies a first speed threshold associated with the first environmental condition and a second speed threshold associated with the second environmental condition;
generating driver speed data based on the plurality of streams of position data;
comparing the driver speed data to the speed tolerance data;
generating, based on the comparing of the driver speed data to the speed tolerance data a first speeding percentage value and a second speeding percentage value, the first speeding percentage value corresponding to a first percentage of at least a subset the plurality of routes along which the one or more vehicles were speeding by at least the first speed threshold while driven by the driver during the time period and before the at least one checkpoint, the second speeding percentage value corresponding to a second percentage of at least the subset of the plurality of routes along which the one or more vehicles were speeding by at least the second speed threshold while driven by the driver during the time period and before the at least one checkpoint;
generating a report identifying at least the driver, the time period, and the first speeding percentage value and the second speeding percentage value; and
sending the report to a recipient device.

* * * * *